United States Patent [19]

Matsumoto et al.

[11] Patent Number: 4,766,658
[45] Date of Patent: Aug. 30, 1988

[54] METHOD OF PRODUCING COMPOSITE NUCLEAR FUEL CLADDING

[75] Inventors: Toshihiro Matsumoto, Hitachi; Hajime Umehara, Katsuta; Junjiro Nakajima, Hitachi; Norihisa Fujii, Katsuta, all of Japan

[73] Assignee: Hitachi, Ltd., Tokyo, Japan

[21] Appl. No.: 884,895

[22] Filed: Jul. 14, 1986

[30] Foreign Application Priority Data

Jul. 12, 1985 [JP] Japan ................................. 60-152261

[51] Int. Cl.$^4$ ........................ B23P 17/00; G21C 3/20
[52] U.S. Cl. ...................................... 29/527.7; 29/407; 29/517; 29/527.5; 29/906; 164/469; 164/494
[58] Field of Search ............. 29/400 N, 455 LM, 517, 29/527.5, 407; 376/414, 416, 417; 75/10.14, 10.26, 65 EB; 148/3, 11.5 F, 133, 421; 164/4.1, 469, 494, 495

[56] References Cited

U.S. PATENT DOCUMENTS 3,838,288  9/1974  Stolz et al. ........................... 250/492
4,200,492  4/1980  Armijo et al. ........................ 176/82
4,406,012  9/1983  Gordon et al. ...................... 376/414

FOREIGN PATENT DOCUMENTS 146314   6/1985  European Pat. Off. .
  1519   4/1938  Japan .
 67788  11/1979  Japan .
936875   9/1963  United Kingdom .

Primary Examiner—Timothy V. Eley
Attorney, Agent, or Firm—Antonelli, Terry & Wands

[57] ABSTRACT

A method of producing a composite nuclear fuel cladding lined with a liner of high purity zirconium characterized in that a raw material of zirconium sponge disposed in a hearth cavity is irradiated with an electron beam while controlling an amount of heat per unit volume (w.sec/mm$^3$) according to an oxygen removal rate of the raw material determined by oxygen concentration of the raw material and a target oxygen concentration of an ingot for a liner to be refined, and zircaloy cladding is lined with the liner. The hearth cavity has a preferable shape in which the ratio of the cavity surface to the cavity volume is 0.20 mm$^{-1}$ or larger.

7 Claims, 4 Drawing Sheets

FIG. 3
FIG. 2
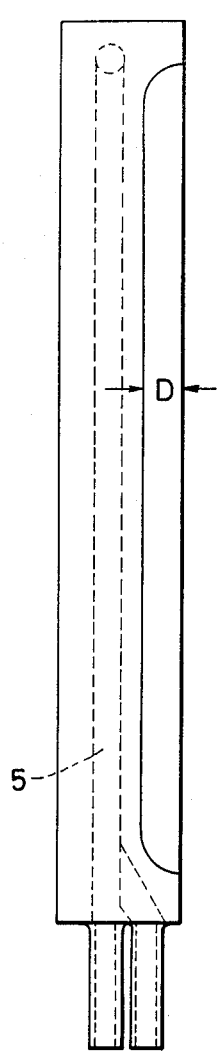
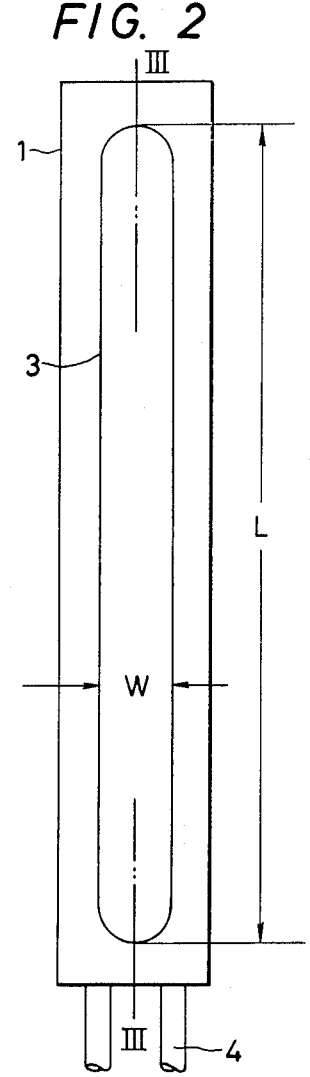
FIG. 4
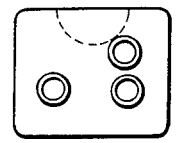

METHOD OF PRODUCING COMPOSITE NUCLEAR FUEL CLADDING

BACKGROUND OF THE INVENTION

This invention relates to a method of producing a composite nuclear fuel cladding, and more particularly to a method of producing a zirconium liner lined on the inner surface of a fuel cladding of zirconium alloy covering nuclear fuel pellets.

A fuel cladding used in a nuclear reactor is required to have an excellent corrosion resistance, non-reactivity and excellent thermal conductivity, a small neutron absorption section, etc. Zirconium alloy satisfies the above-mentioned properties, and therefore is widely used for the fuel cladding.

The fuel claddings of zirconium alloy can function very well, however when a great change in reactor load takes place there is the danger that they are subjected to stress corrosion cracking and resultant breakage because of the corrosive action of iodine gas released from the nuclear fuel pellets contained in the fuel cladding and the stresses generated by the expansion of the fuel pellets.

In order to prevent such stress corrosion cracking in fuel cladding, a barrier made of one of various metals is provided between each cladding and the fuel pellets therein. A composite nuclear fuel cladding made of a zirconium alloy and lined with high purity zirconium as a metal barrier is disclosed in Japanese Patent Laid-Open No. 54-59600/1979.

High purity zirconium is used because the pure zirconium liner is capable of remaining more flexible than zirconium alloys during neutron irradiation, and has the effect of reducing local strains produced in the zirconium alloy cladding to prevent stresses and stress corrosion cracking. In order that the zirconium liner functions well, it is preferable for the liner to have the purity of crystal-bar zirconium.

A conventional method of producing crystal-bar zirconium is known in which sponge zirconium is iodinated and then the resultant iodide is subjected to chemical vapor deposition to form zirconium crystal bars. With this method, the reaction speed of the formation of zirconium by the thermal decomposition of zirconium iodide is extremely slow, and is therefore unsuitable for mass-production, so that the cost of the zirconium produced thereby is extremely high.

Another conventional method of producing high purity zirconium is an electron-beam melting method in which a material to be melted can be subjected to a high temperature in a high vacuum atmosphere, whereby impurity elements of a high vapor pressure such as iron are evaporated away. Further, as for a removal mechanism of gases such as oxygen, hydrogen, nitrogen, etc., the hydrogen and nitrogen are separated from the molten metal surface into the vacuum atmosphere in a state of $H_2$, $N_2$ while the probability that the oxygen transfers to a gas phase in an atom state is small, the removal of the oxygen is effected based on the phenomenon of volatile deoxidization such that the oxygen is evaporated away in a state of volatile oxides. Namely zirconium can be evaporated away in a form of $ZrO$. Removal efficiency of iron and oxygen is determined by comparing the vapor pressure of zirconium itself and the vapor pressure of iron, $ZrO$. The vapor pressure ratios between the zirconium and iron, and between the zirconium and $ZrO$ are given as follows:

$$Fe/Zr = 10^5, \quad ZrO/Zr = 10^2.$$

The above relations show that the zirconium can be refined by effectively effecting the electron beam melting.

The electron beam melting method is roughly classified into a rod melting method in which a material to be melted is irradiated with electron beam to drop the molten metal thereby forming a rod-like ingot, and a hearth melting method in which a material to be melted is inserted in a hearth mold and radiated with an electron beam while moving the hearth or an electron gun.

Japanese Patent Publication No. 41-1519 (1966) discloses a hearth melting method; however, it is silent on a hearth mold shape.

Japanese Patent Laid-Open No. 56-67788 also discloses a melting method; however, it can not determine the purity of the material after melting.

In a zirconium liner material, it is thought that a substance causing irradiation hardening is oxygen of impurities contained in metal zirconium. On the other hand, iron contained in the zirconium also should be removed. The solubility of iron in zirconium is small, so that it is easily precipitated. Parts around the precipitations are chemically active and easily chemically attacked. Particularly, when stresses are applied on the zirconium, the stresses concentrate on the precipitations in the grain boundaries, and cracking takes place from those parts. Therefore, reduction of the precipitations by decreasing an amount of iron contained in the zirconium liner of a nuclear fuel cladding results in decreasing the number of sites which are starting points of cracking. Namely, the reduction in the number of the precipitations has the effect that the liner is not easily chemically attacked by iodine of a corrosive fission product, whereby the prevention of the stress corrosion cracking of the fuel cladding is further improved.

Further, at present, there is a plan that burning of nuclear fuel is extended. The extension of the burning causes corrosive fission products such as iodine to increase. Accordingly, from the point of view of improvement of reliability, the amount of iron contained in the zirconium liner should be reduced.

SUMMARY OF THE INVENTION

An object of the present invention is to provide a method of economically producing a composite nuclear fuel cladding lined with a high purity zirconium liner.

Another object of the present invention is to provide a method of producing a composite nuclear fuel cladding lined with a zirconium liner which is refined to a predetermined concentration or less of impurities such as oxygen and iron in an economical and mass-productive manner.

A feature of the present invention is that a raw material for a zirconium liner is melted by controlling an amount of heat per a unit volume (w·sec/mm$^3$) supplied to the raw material according to a removal rate of impurities contained in the raw material using a hearth under a high vacuum atmosphere, so that an ingot with a predetermined impurity concentration is obtained.

An aspect of the present invention is that the cavity of the hearth has a ratio of the sectional area to the space volume larger than a certain value, preferably 0.20 mm$^{-1}$.

A composite nuclear fuel cladding lined with thus refined high purity zirconium liner has excellent PCI (pellet cladding interaction) resistance.

BRIEF DESCRIPTION OF THE DRAWINGS

FIG. 2 is a plan view of a hearth used in the production of composite nuclear fuel claddings;

FIG. 3 is a sectional view taken along a line III—III of FIG. 2;

FIG. 4 is a side view of FIG. 2;

DESCRIPTION OF THE PREFERRED EMBODIMENT

Figure 1:
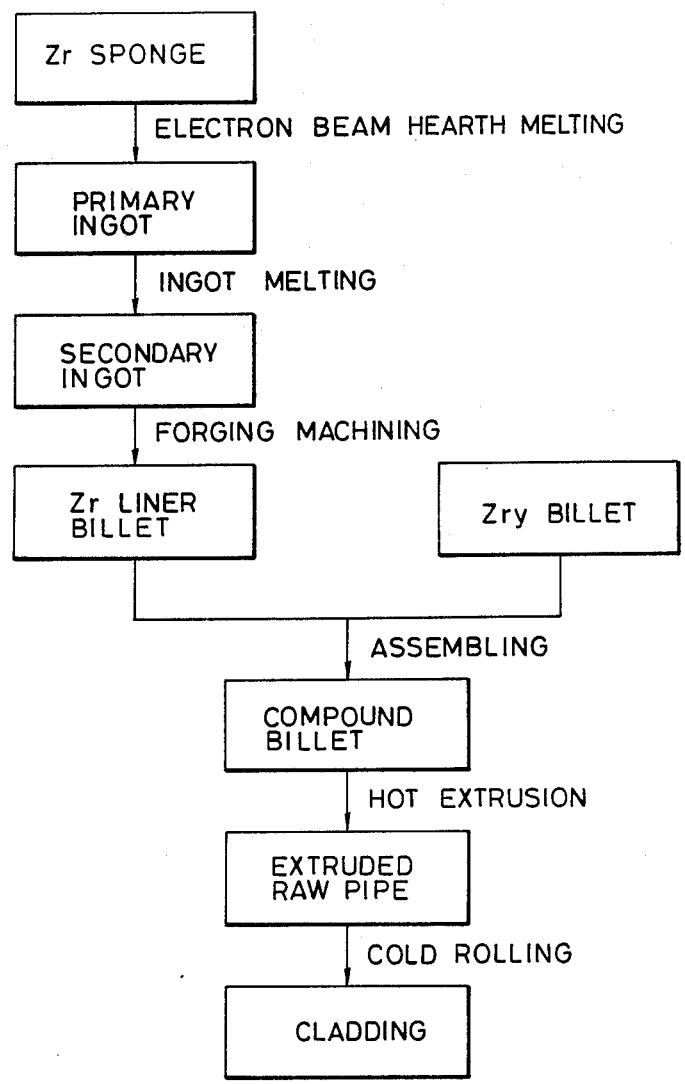
FIG. 1 is a flow chart of producing a composite nuclear fuel cladding according to an embodiment of the present invention; tion.

FIG. 1 is a flow chart showing an embodiment of the present invention. According to this flow chart, a method of producing a composite nuclear fuel cladding with a zirconium liner being lined on the inner surface of the cladding is described.

First, sponge zirconium as raw material for the liner is prepared. The sponge zirconium is disposed in a hearth which is illustrated in FIGS. 2 to 4 to be described later, and melted to refine using a vacuum melting furnace with a heat source of electron beams, whereby a primary ingot is produced. In this step, the vacuum atmosphere of the furnace is kept at a level of $2 \times 10^{-5} - 10^{-6}$ torr. When the zirconium sponge is used as raw material, it is necessary to practice a preliminary melting with a small amount of heat of 50 (w·sec/mm$^3$) or less being supplied before the melting to refine, and to make the surface of the raw material uniform, in order that the electron beams passing through the raw material will not reach the hearth bottom.

The primary ingot is subjected to ingot melting or rod melting thereby producing a secondary ingot. A plurality of the primary ingots are prepared for one secondary ingot. As for a melting method in the step of ingot melting, a vacuum arc melting, a plasma arc melting, etc. can be used besides the electron beam melting if they do not incorporate impurities such as oxygen, iron, etc. In practice, this step also is necessary to keep the atmosphere of an ingot melting room or chamber at a high vacuum level as in the step of melting to refine during the ingot melting, because the vacuum degree during the melting greatly influences the removal of oxygen.

Table 1 shows concentrations of oxygen and iron in the raw material (Zr sponge), the primary ingot formed in the step of melting to refine and the secondary ingot produced in the step of ingot melting, wherein in each of the steps electron beam melting is employed. It is noted from this Table that any oxygen is incorporated in the ingot melting. Therefore, the electron beam melting is effective in the step of ingot melting.

TABLE 1

| Steps | Concentration | |
|---|---|---|
| | Oxygen | Iron |
| Raw Material (Zr Sponge) | 700 ppm | 640 ppm |
| Step of Melting to Refine (Electron Beam Melting) | 470 ppm | 100 ppm |
| Step of Ingot Melting (Electron Beam Melting) | 470 ppm | 25 ppm |

TABLE 1-continued

The secondary ingot, which is columnar, is subjected to forging and then machining for perforating the columnar ingot, thereby forming a zirconium liner billet.

The secondary ingot thus formed is inserted in the inner surface of a zircaloy-2 (Zry-2) billet which is prepared as a fuel cladding, and joined to the Zry-2 billet; thus, the two billets are assembled to form a composite billet.

The composite billet is subjected to hot extrusion and then cold rolling several times, whereby a composite nuclear fuel cladding lined with high purity zirconium is formed.

The concentrations of oxygen and iron of the raw material (Zr-sponge) to be melted to refine, and the achieved concentrations of them after the melting to refine are given in Table 2.

TABLE 2

| | Oxygen Concentration (ppm) | | | Iron Concentration (ppm) | | |
|---|---|---|---|---|---|---|
| Raw Material | 730 | 680 | 580 | 740 | 350 | 695 |
| After the melting to refine | 350 | 370 | 120 | 10 | 35 | 20 |

Figure 5:
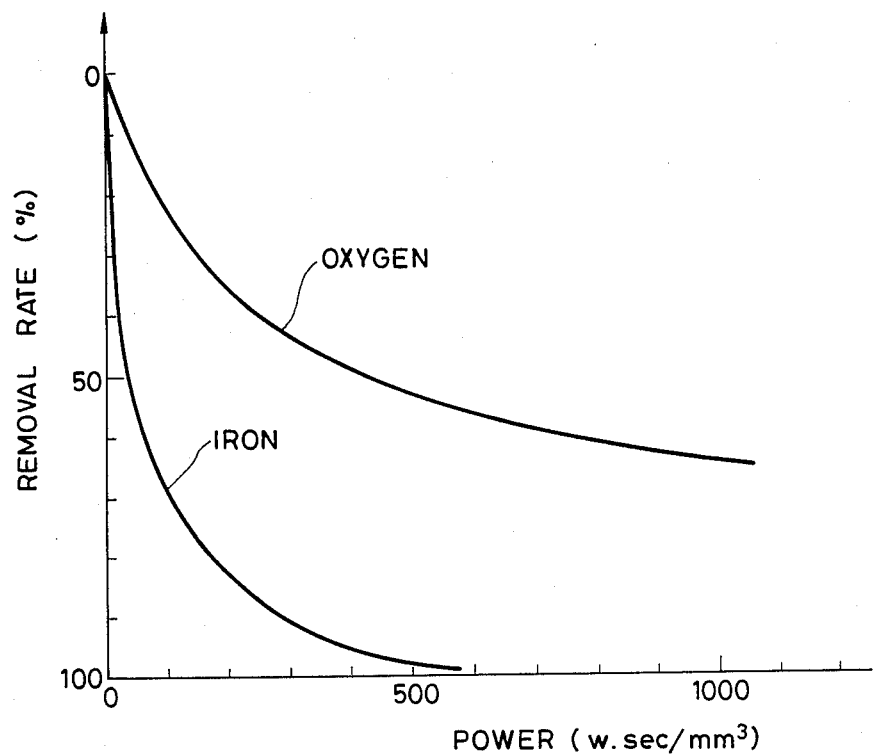
FIG. 5 is a graph showing the relationships between power (w·sec/mm$^3$) and removal rate.
Figure 6:
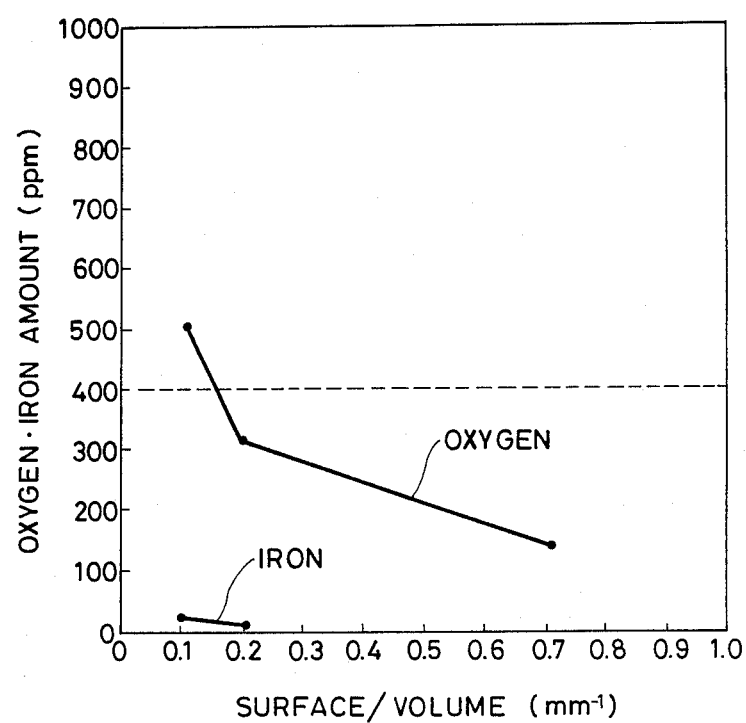
FIG. 6 is a graph showing the relationships between surface/volume and oxygen iron amount (ppm).

FIG. 5 shows relationships between removal rates of oxygen and iron and an amount of heat per unit volume supplied to the material to be melted, wherein the removal rate of impurities is given as follows:

$$\text{Removal rate (\%)} = \left( 1 - \frac{\text{impurity concentration achieved after melting to refine}}{\text{impurity concentration of the raw mterial}} \right) \times 100.$$

As noted in FIG. 5, it is found that an impurity amount or an impurity concentration of material melted and refined is determined by controlling an amount of heat per unit volume supplied to the material to be melted and refined, according to the removal rate, even if amounts of impurities of raw materials are different.

For example, when it is intended to produce a primary ingot having a concentration of 300 ppm (target concentration in this example) from a raw material, zirconium sponge, of oxygen concentration of 680 ppm, since the removal rate is nearly equal to 56%, an amount of heat per unit volume (w·s/mm$^3$) to be supplied to the raw material is determined according to a relationship between the removal rate and an amount of heat per unit as shown in FIG. 5. In practice, since the shape of the hearth cavity, an amount of raw material to be charged and an output of an electron gun (for example, 10kW) are predetermined, a velocity of a relative movement between the electron beam or the electron gun and the hearth is controlled so that the material receives the heat amount per unit volume determined according to the relationship between the removal rate and the heat amount per unit volume. According to this method, an ingot of a desired purity concentration can be obtained with minimized energy consumption.

Factors influencing a refining effect are not only the heat amount per unit volume supplied to the material to be melted, but also the cavity shape of the hearth which greatly influences the refining effect in the electron beam melting to refine or electron beam hearth melting.

The hearth 1 is illustrated in FIGS. 2 to 4. The hearth has a cavity 3 and a cooling passage 5. The cooling passage 5 is provided with a pair of pipes 4 one of which is for introducing a coolant and the other is for discharging a heat-exchanged coolant. The cavity 3 has a depth (D), a width (W) which is larger than the depth, and a length (L) which is longer than the width. The cavity 3 has a semicircular bottom which is effective to remove impurities by electron beam irradiation.

Three hearths No. 1 to No. 3, each of which has a cavity shape as shown in FIGS. 2 to 4, and scales as shown in Table 3 are prepared, and refining effects on the oxygen concentration and the iron concentration are examined on the Zr material refined using the three hearths.

TABLE 3

| | Cavity Shape | | |
|---|---|---|---|
| Hearth No. | Width (W) (mm) | Depth (D) (mm) | Length (L) (mm) |
| Hearth No. 1 | 8 | 4 | 100 |
| Hearth No. 2 | 28 | 14 | 200 |
| Hearth No. 3 | 50 | 30 | 200 |

The oxygen concentration and iron concentration of the Zr material melted by the hearths having cavities specified in Table 3, are given in Table 4.

The melting conditions such as heat amounts per unit volume supplied to melt, vacuum degree, etc., are kept the same for each hearth No. 1, No. 2, and No. 3.

TABLE 4

| Hearth No. | Surface/ Volume ($mm^{-1}$) | Oxygen Concentration (ppm) | Iron Concentration (ppm) |
|---|---|---|---|
| Hearth No. 1 | 0.71 | 121 | 10 |
| Hearth No. 2 | 0.20 | 315 | 10 |
| Hearth No. 3 | 0.11 | 500 | 20 |

As is apparent from Table 4, the larger the ratio of the surface of the cavity to the cavity volume, the more the refining effect increases. Namely, in order to effectively refine the same amount of molten metal, it is necessary to reduce the sectional area of material to be melted and increase the length. The cavity shape having the ratio of 0.20 mm⁻or larger is preferable for economically refining raw material such as Zr sponge, namely such a cavity shape can refine with smaller energy consumption.

We claim:

1. A method of producing a composite nuclear fuel cladding lined with a liner of high purity zirconium, which method comprises the steps of:

charging a hearth cavity with a raw material of zirconium;

determining a removal rate of oxygen contained in the raw material, based on a concentration of oxygen contained in the raw material and a target concentration of oxygen contained in a zirconium ingot to be produced;

determining an amount of heat per unit volume (w·sec/mm$^3$) to be supplied to said raw material according to said removal rate;

melting and refining the raw material by irradiating an electron beam on the raw material while controlling an amount of heat per unit volume (w·sec/mm$^3$) to be supplied to the raw material, thereby producing at least one refined ingot of zirconium;

forming a liner using at least one refined ingot of zirconium;

assembling said liner in a tube for a fuel cladding; and subjecting said assembled tube and liner to plastic deformation, thereby forming a composite nuclear fuel cladding.

2. A method of producing a composite nuclear fuel cladding lined with a liner of high purity zirconium, which method comprises the steps of:

charging a raw material of sponge zirconium into a hearth cavity disposed horizontally and having a width, a depth and a length, said length being longer than each of said width and depth;

determining a removal rate of an oxygen contained in the raw material, based on a concentration of the oxygen contained in the raw material and a target concentration of the oxygen contained in a zirconium ingot to be produced;

determining an amount of heat per unit volume (w·sec/mm$^3$) to be supplied to said raw material according to said removal rate;

irradiating the raw material with an electron beam while moving the hearth relative to the electron beam in the length direction of the hearth so that the raw material is supplied with the determined heat amount per unit volume, whereby high purity ingots are provided;

forming a columnar ingot by remelting said ingots;

forging said columnar ingot;

perforating said columnar ingot to form a liner billet for lining;

inserting the liner billet into a zirconium alloy billet to form a composite billet;

subjecting the composite billet to hot extrusion to form an extruded tube; and subjecting the extruded tube to cold rolling, thereby producing a composite nuclear fuel cladding.

3. The method as defined in claim 2, wherein said hearth cavity has a ratio of the cavity surface to the cavity space volume, the ratio being 0.20 (mm$^{-1}$) or more.

4. The method as defined in claim 3, wherein in said step of melting raw material, the raw material is melted under a high vacuum atmosphere more than $2 \times 10^{-5}$ torr.

5. The method as defined in claim 2, wherein said step of melting the raw material comprises the steps of:

melting said raw material with a heat amount of 50 w·sec/mm$^3$ or less; and then melting said raw material with an electron beam of a heat amount determined in said step of determining an amount of heat per unit volume to be supplied to said raw material.

6. The method as defined in claim 2, wherein the width of said hearth cavity is larger than the depth of said hearth cavity.

7. The method as defined in claim 6, wherein the hearth cavity has a bottom which is semicircular in a plane perpendicular to the length direction.

* * * * *